United States Patent [19]

Mertz

[11] Patent Number: 4,805,870
[45] Date of Patent: Feb. 21, 1989

[54] COIL RETAINER FOR SOLENOID

[75] Inventor: Denny W. Mertz, St. Louis County, Mo.

[73] Assignee: Emerson Electric Co., St. Louis, Mo.

[21] Appl. No.: 715,588

[22] Filed: Mar. 25, 1985

Related U.S. Application Data

[63] Continuation of Ser. No. 463,626, Feb. 3, 1983, abandoned.

[51] Int. Cl.[4] .............................................. F16K 31/02
[52] U.S. Cl. ............................. 251/129.15; 335/251; 335/255; 335/261
[58] Field of Search ................ 251/129, 141; 335/251, 335/255, 261; 403/155, 241, 326-329; 411/358, 359, 363, 364, 513, 530; 285/305, 317, 318; 29/243.5

[56] References Cited

U.S. PATENT DOCUMENTS

| | | | |
|---|---|---|---|
| 1,932,878 | 10/1933 | Akizawa | 403/326 X |
| 2,284,004 | 5/1942 | McCurdy | 403/326 X |
| 2,301,786 | 11/1942 | Millermaster | 411/530 X |
| 2,396,084 | 3/1946 | Clark | 403/155 X |
| 2,413,869 | 1/1947 | Hamer | 251/333 X |
| 2,520,725 | 8/1950 | Judd | 403/326 X |
| 2,627,544 | 2/1953 | Eck | 251/129 X |
| 3,231,233 | 1/1966 | Herion | 251/141 X |
| 3,259,346 | 7/1966 | Rogers | 411/513 X |
| 3,262,027 | 7/1966 | Zaleske et al. | 251/141 X |
| 3,313,126 | 4/1967 | Somervell | 403/326 X |

Primary Examiner—James C. Yeung
Attorney, Agent, or Firm—Polster, Polster and Lucchesi

[57] ABSTRACT

A solenoid operated valve is disclosed having a valve housing including a passage therethrough, a valve seat within the passage, and a valve member movable between an open and a closed position. A solenoid actuator is provided for effecting movement of the valve member. The solenoid includes a coil selectively energizable and de-energizable by a source of electric power for generating a magnetic flux. A tube is provided having a closed outer end and an open inner end disposed generally coaxially with respect to the coil, and with the inner end of the tube being secured to the valve housing. The tube receives the valve member as it moves axially within the tube between its open and closed positions. A housing receives the coil and the housing has an outer face with an opening therein such that with the housing and the coil receiving the tube, the outer end of the tube extends out beyond the outer face of the housing. Specifically, the tube has a circumferential groove therearound adjacent its outer end and the groove is spaced beyond the outer face of the housing. A fastener, such as a spring clip, is provided which is secured to the housing and is carried on the outer face of the housing so as to resiliently cooperate with the groove on the tube as the housing and the coil are installed on the tube so as to secure the housing and the coil relative to the tube.

5 Claims, 2 Drawing Sheets

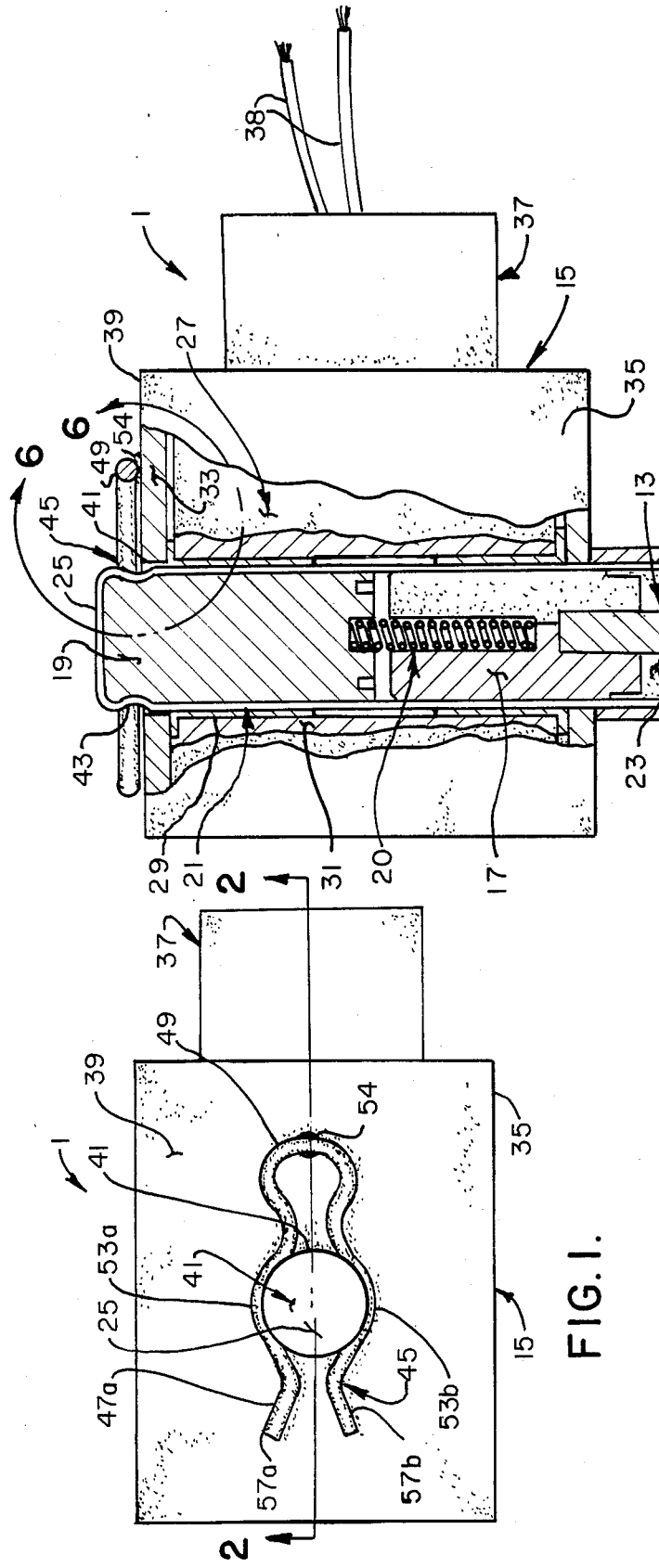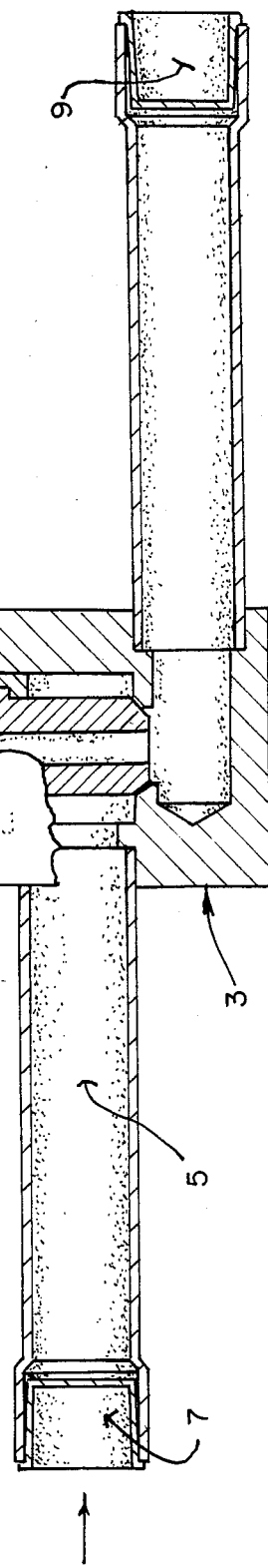

COIL RETAINER FOR SOLENOID

This is a continuation application of copending application Ser No. 463,626, filed on Feb. 3, 1983, abandoned.

BACKGROUND OF THE INVENTION

This invention relates to a retainer for the coil assembly of a solenoid valve. More specifically, this invention relates to such a retainer which permits the solenoid actuator assembly, of a solenoid operated valve, such as may be conventionally used in refrigeration systems or the like, to readily be removed from the valve body so as to facilitate repair of the valve.

In many instances, solenoid valves are commonly used to regulate or control the flow of fluid, such as a refrigerant in a refrigeration system, or to control the flow of steam in a heating system. Additionally, there are many other applications for solenoid operated valves in many industrial applications. Typically, these valves include a valve housing or body having a flow passage therethrough with a valve seat within the flow passage. A valve member is movable between a closed position in which it sealingly cooperates with the valve seat so as to block the flow of fluid through the passage and an open position so as to permit the flow of fluid A solenoid actuator is provided which typically comprises a coil of wire so wound as to generate a magnetic flux field through its center when energized. A movable armature is connected to the valve member so that upon energization and de-energization of the coil, the magnetic flux generated thereby serves to move the armature axially into and out of the center of the coil so as to result in opening and closing movement of the valve.

In many types of solenoid valves, such as is shown in U.S. Pat. Nos. 2,343,806, 3,281,740 and 3,262,027, the movable armature for the solenoid valve is movable axially within a so-called enclosure tube which is sealably secured relative to the valve housing. Typically, the enclosure tube is of a relatively thin gauge non-magnetic sheet metal, such as stainless steel or the like, and has an open inner end so that the armature may be readily connected to the valve member and a closed upper end. The enclosure tube is sealed relative to the valve housing such that the escape of the fluid (e.g., refrigerant) is prevented.

Further, a solenoid coil is typically wound on a spool and the spool and the coil surround the outer surface of the enclosure tube such that the lines of flux of the coil run generally axially through the enclosure tube and through the core member. Solenoid valves may be either of normally open or of normally closed construction, depending upon their particular application, and solenoid valves typically rely on a spring to move the valve to a desired position (either to its open or closed position) when the valve is in its de-energized position. Further, the valve typically includes a housing which surrounds and encloses the solenoid coil As shown in U.S. Pat. No. 2,343,806, the housing was secured relative to the enclosing tube by means of a screw or the like. In U.S. Pat. No. 3,262,027, the outer, closed end of the enclosure tube is shown to extend through an opening in the outer face of the housing for the solenoid, and the solenoid housing together with the solenoid therewithin is secured relative to the enclosure tube by means of a snap ring received in a circumferential groove formed in the outer end of the enclosing tube. Still further, in U.S. Pat. No. 3,281,740, a hinged plastic securement member is affixed to the outer end of the enclosure tube extending out beyond the outer face of the enclosure and a cap is adapted to snap into place to a collar portion of the plastic retainer thereby to positively hold the solenoid assembly in fixed axial position on the enclosure tube.

However, it has been found in practice that the various prior art threaded fasteners, snap rings, and plastic snap closures and other snap caps for holding the solenoid on the enclosure tube were difficult to remove and install by service personnel in the field and were easily lost. It will be appreciated that it is a generally common procedure for field service personnel, in servicing refrigeration systems, to remove the solenoid actuator from the solenoid valve for testing or replacement without opening the refrigeration system merely by removing the solenoid coil from the valve and by replacing it with another.

Thus, there has been a longstanding need so as to permit field service personnel to readily remove the solenoid actuator of a solenoid valve from the valve assembly per se and to permit the ready reinstallation of the solenoid actuator. It has been further desirable that this could be accomplished without the use of even simple handtools.

SUMMARY OF THE INVENTION

Among the several objects and features of this invention may be noted the provision of a solenoid valve in which the solenoid actuator is readily removable from the enclosure tube of the valve assembly and in which the solenoid actuator is positively maintained in a desired position relative to the enclosure tube and the valve body, and further such that the retaining mean is positively affixed to and carried by the solenoid actuator such that it cannot be inadvertently misplaced or lost by field service personnel upon the removal of the solenoid actuator;

the provision of such a retaining system which presents rotation between the solenoid actuator and the enclosure tube;

the provision of such a retaining system for positively holding the solenoid actuator on the enclosure tube of a solenoid valve which does not require even relatively simple handtools for installation thereof and which does not require the use of tools for the removal of the solenoid actuator from the enclosure tube; and the provision of such a solenoid valve which facilitates field servicing of the valve and eliminates lost parts and the like during servicing.

Other objects and features will be in part apparent and in part pointed out hereinafter.

Briefly stated, a solenoid operated valve typically comprises a valve body having a passage therethrough for the flow of a fluid. A valve seat is provided within this passage and a valve member is movable between an open position in which the fluid flows through the flow passage and a closed position in which the valve member cooperates with the valve seats so as to block the flow of fluid through the passage. A solenoid actuator is provided for effecting movement of the valve member between its open and closed position, this solenoid means comprising a coil selectively energizable and de-energizable by a source of electric power for generating a magnetic flux. A tube having a closed outer end and an inner end disposed generally coaxially with respect to said coil is provided. The inner end of the tube is secured to the valve body and the tube receives, at least in part, the valve member as it moves axially within the tube as it moves between its opened and closed positions. A housing receives the coil and the housing is defined to have an outer face with an opening therein such that with the housing and the coil receiving the tube the outer end of the tube extends out beyond the outer face of the housing. More specifically, this invention relates to an improvement in which the tube has a circumferential groove adjacent its outer end, this groove being spaced beyond the outer face of the housing. Fastening means is secured to the housing and is carried on the outer face thereof so as to be resiliently cooperable with the groove on the tube as the housing and the coil are installed on the tube so as to secure the housing and the coil relative to the tube.

BRIEF DESCRIPTION OF THE DRAWINGS

FIG. 1 is a top plan view of a solenoid valve of the present invention utilizing a hairpin-type retainer so as to removably secure the solenoid actuator to the valve assembly;

FIG. 2 is a vertical cross sectional view of the solenoid valve taken along line 2—2 of FIG. 1;

Corresponding reference characters indicate corresponding parts throughout the several views of the drawings.

DESCRIPTION OF PREFERRED EMBODIMENTS

Figure 3:
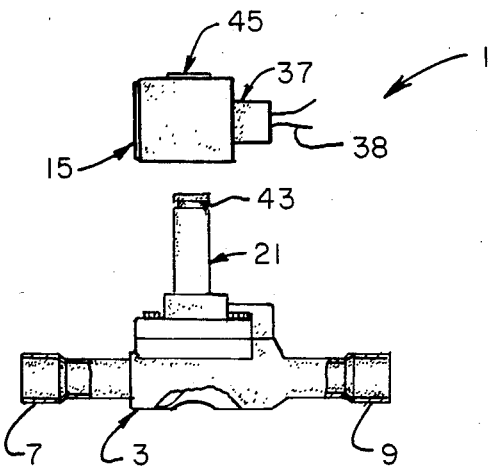
FIG. 3 is a partially exploded side elevational view of another style of solenoid valve with the solenoid actuator removed from the valve assembly.

Referring now to the drawings, a solenoid actuator valve is indicated in its entirety by reference character 1. Such solenoid operated valves are conventionally used in refrigeration systems for controlling the flow of refrigerant. While these valves may vary considerably in size and while they may either be a normally open or normally closed valve, depending on their application, it will be understood that the valve illustrated and described herein is a normally closed valve and it is maintained in its closed position by means of a compression coil spring that will be explained in detail hereinafter. However, valves of normally open or other construction are within the broader scope of this invention.

More specifically, solenoid valve 1 includes a valve body 3 having a flow passage, as generally indicated at 5, therethrough, the flow passage having an inlet 7 and an outlet 9 with the inlet and outlet being adapted to be sealably secured to refrigerant lines (not shown) for the flow of refrigerant (or other fluid) through the flow passage. A valve seat 11 is defined within valve body 3 and is within flow passage 5. A movable valve member, as generally indicated at 13, is provided in solenoid valve 1 and is movable between a closed position (shown in FIG. 2) in which it sealingly cooperates with valve seat 11 thereby to block the flow of fluid through flow passage 5 and an axially retracted or open position (not shown) in which it is clear of the valve seat thereby to permit the flow of fluid through the flow passage. As is conventional, valve member 13 is selectively moved between its open and closed position by means of a solenoid actuator 15.

More specifically, solenoid actuator 15 includes a movable armature 17 connected to valve member 13 and a fixed armature 19. A compression coil spring 20 is interposed between the movable and fixed armatures so as to bias the movable armature 17 together with valve member 13 away from fixed armature 19 and so as to maintain valve member 13 in sealing engagement with valve seat 11. As heretofore explained, solenoid valve 1 illustrated herein is a normally closed valve. Upon energization of the solenoid actuator, movable armature 17 will be magnetically drawn axially inwardly toward fixed armature 19 thereby to compress spring 20 and to move valve member 13 clear of valve seat 11.

As indicated at 21, a so-called enclosure tube of nonmagnetic material (e.g., stainless steel) is provided in which both the movable armature 17 and the fixed armature 19 are disposed. As indicated at 23, the lower end of enclosure tube 21 is open and is sealingly secured to valve body 3 in communication with flow passage 5. Further, the upper end of enclosure tube 21 is closed or sealed, as indicated at 25.

Solenoid actuator 15 further includes a coil assembly 27 including a spool 29 around which is wound a multiplicity of turns of wire so as to form a coil 31. As shown in FIG. 2, a potting material may optionally be cast-in-place around spool 29 and coil 31 thereby to enclose or encapsulate the coil. Spool 29 with coil 31 wound thereon, the spool and the coil are carried by a formed, sheet metal yoke 33. The yoke, together with the spool and the coil, are enclosed by a sheet metal coil housing 35. Further, an electrical fitting or junction, as indicated at 37, may be secured to coil housing 35 so as to permit lead wires 38 for energizing coil 31 to enter and exit the coil housing.

As shown best in FIG. 1, coil housing 35 has an upper face 39 and has a central opening 41 therewithin. As shown in FIG. 2, enclosure tube 21 is such a length so that with the solenoid actuator assembly 15 received on the enclosure tube, as shown in FIG. 2, the closed end 25 of the enclosure tube extends out beyond the outer face 39 of coil housing 35. Further, as indicated at 43, a circumferential groove is provided in enclosure tube 21 proximate its closed end 25 with this circumferential groove being spaced somewhat outwardly beyond outer face 39 of coil housing 35.

In accordance with this invention, resilient retaining means, as generally indicated at 45, is provided on coil housing 35 so as to be engagable with the outer end of enclosure tube 21 thereby to positively hold the solenoid actuator 15 on valve body 3 via the enclosure tube 21. More specifically, resilient retaining means 45 is shown to be a spring clip fixedly secured to coil housing 35 with the spring clip, as shown in FIGS. 1-3, being of a hairpin configuration having a pair of spaced apart arms 47a, 47b on opposite sides of opening 41. The spring clip further includes a base portion 49 interconnecting arms 47a, 47b with the arms having outer end portions 51a, 51b. As indicated at 53a, 53b, each of the arms of the spring clip has a respective portion proximate opening 41 cooperable with circumferential groove 43 in the outer end portion of enclosure tube 21 so as to positively hold the solenoid actuator assembly 15 in fixed axial position relative to enclosure tube 21. It will be appreciated that as the upper shoulders of enclosure tube 21 spaced axially outwardly beyond circumferential groove 43 engage portions 43a, 43b of spring clip 45 as the actuator solenoid 15 is inserted on the enclosure tube, the outer ends of the enclosure tube apply a camming force on the sides of the spring clip portions 53a, 53b so as to force arms 47a, 47b away from one another thereby to permit enclosure tube 21 to pass therebetween. As the solenoid actuator assumes its fully installed position on the enclosure tube, and as arms 47a, 47b of the spring clip move into register with circumferential groove 43, the arms 47a, 47b are permitted to resiliently snap back into their normal position and thereby to positively restrain solenoid actuator 15 against axial movement relative to enclosure tube 21. Thus, the solenoid actuator is positively maintained in its desired installed position on valve body 3 and on enclosure tube 21.

For removal of the solenoid actuator, the outer ends 51a, 51b of the spring clip arms may be forced apart thereby to permit the solenoid actuator to be removed from the enclosure tube for repair. The outer ends of the spring clip arms may be moved outwardly either by prying them outwardly with a tool, such as a screwdriver. However, a more preferred manner of removing actuator 15 from tube 21 involves utilizing the transitions leading from the cylindrical wall of enclosure tube 21 to circumferential groove 43 as a cam surface so that upon manually pulling solenoid actuator 15 axially outwardly on enclosure tube 21, a camming force is exerted on spring clip portions 53a, 53b thereby to force the spring clip arms outwardly and to permit the removal of the solenoid actuator without the use of even simple hand tools.

Figure 6:
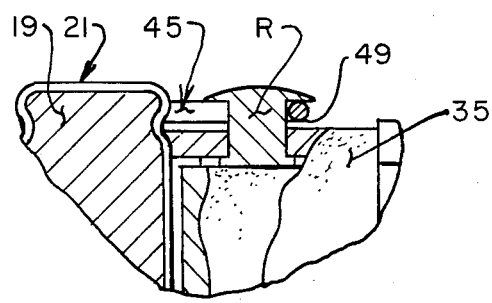
FIG. 6 is a view taken along line 6—6 of FIG. 2 showing an alternative manner of securing the retainer to the solenoid actuator.

Further, in accordance with this invention, spring clip 47 is positively secured to coil housing 35 by means of spot welding or the like, as indicated at 54. Preferably, base 49 of spring clip 45 is spot welded to the outer face of the coil housing thereby to permit the arms 47a, 47b to resiliently flex toward and away from one another and to move relative to the coil housing 35. Alternatively, as shown in FIG. 6, spring clip 47 may be secured to coil housing 35 by means of a rivet R. In certain instances, the use of rivet R may be preferred to spot welding, as described above, for securing the retainer to the housing.

In FIG. 3, another embodiment of valve 1 is illustrated utilizing spring clip 45, the valve being illustrated with solenoid actuator 15 removed from enclosure tube 21. It will be seen that even with the solenoid actuator removed, the spring clip 45 remains in place on housing 35 and thus is not susceptible to being lost.

Figures 4, 5:
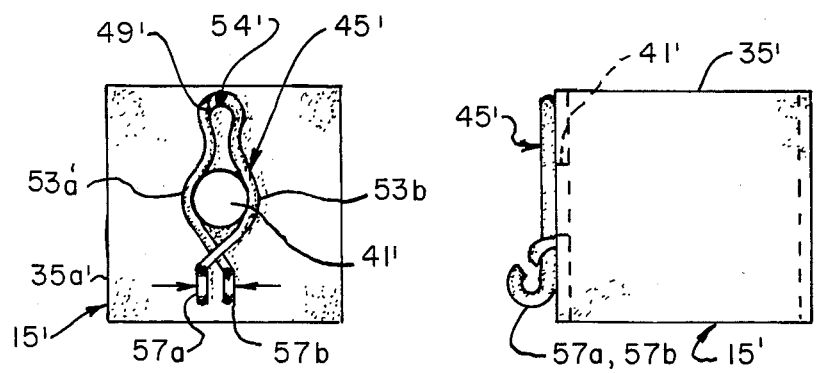
FIG. 4 is a top plan view of the solenoid valve illustrating another embodiment of the retainer of the present invention.
FIG. 5 is a right side elevational view of FIG. 4.

Referring now to FIGS. 4 and 5, an alternative embodiment of spring clip 45 is illustrated, with this alternative embodiment being identified by reference character 45'. It will be understood that "primed" reference characters indicate parts having a corresponding construction and function to parts heretofore described Basically, spring clip 45' differs in construction from spring clip 45 heretofore described in that the outer ends of spring clip 45' cross one another as best shown in FIG. 4 and have finger tabs 57a, 57b provided thereon such that when the finger tabs are squeezed towards one another, the enclosure tube engaging portion 53a', 53b' are moved away from one another thereby to permit the ready installation and removal of the solenoid actuator 15 on valve body 3.

Still further, it will be appreciated that in place of spot welding spring clips 45 or 45" to coil housing 35, the spring clip may be secured to the coil housing by means of a tab (not shown) struck from the coil housing and formed around the base 49 of the spring clip.

In view of the above, it will be seen that the other objects of this invention are achieved and other advantageous results obtained.

As various changes could be made in the above constructions or method without departing from the scope of the invention, it is intended that all matter contained in the above description or shown in the accompanying drawing shall be interpreted as illustrative and not in a limiting sense.

I claim:
1. In a solenoid operated valve comprising a valve body having a passage therethrough of the flow of a fluid, a valve seat within said passage, a valve member movable between an open position in which said fluid flows through said flow passage and a closed position in which said valve member cooperates with said valve seat to block the flow of fluid through said passage, and solenoid actuating means for effecting movement of said valve member between its opened and closed positions, said solenoid actuating means comprising a coil selectively energizable and de-energizable by a source of electrical power for generating a magnetic flux, a tube having a closed outer end and an open inner end disposed generally coaxially with respect to said coil, said inner end of said tube being secured to said valve body, said tube receiving, at least in part, said valve member as it moves axially within said tube as said valve member moves between its open and closed positions, a housing receiving said coil, said housing having an outer face with an opening therein such that with said housing and said coil receiving said tube, the outer end of said tube extends beyond said outer face of said housing, wherein the improvement comprises: said tube having a circumferential groove therearound adjacent its outer end, said groove being spaced beyond the outer face of said housing, and fastening means secured to said housing and being carried on said outer face thereof for resiliently, cammingly cooperating with said groove on said tube as said housing and said coil are installed on said tube by moving said housing and said coil axially with respect to said tube, wherein said fastening means comprises a spring clip having a pair of resilient arms spaced from one another on generally opposite sides of said opening in the outer face of said housing and a base section integral with said arms, said base section being secured to said housing, said arms being cammingly engaged by and being resiliently movable away from one another upon axial movement between said housing and said tube so as to permit the outer end of said tube to be resiliently received by said arms, such that with said groove in register with said arms, said housing and coil are secured together in predetermined axial relation.

2. In a valve as set forth in claim 1 wherein said fastening means is selectively operable to release said tube thereby to permit said housing and said coil to be removed from said tube with said fastening means remaining attached to said housing.

3. In a valve as set forth in claim 1 wherein said base section is riveted to said housing.

4. In a valve as set forth in claim 1 wherein said base section is welded to said housing.

5. In a valve as set forth in claim 1 wherein the outer ends of said arms on the side of said opening opposite said base section cross one another with the outer ends of the arms being spaced front one another so that a squeezing force on the outer ends of the arms moves the portions of the arms cooperable with the grooves away from one another.

* * * * *